US009634527B2

(12) United States Patent
Zhang et al.

(10) Patent No.: US 9,634,527 B2
(45) Date of Patent: Apr. 25, 2017

(54) ELECTRICAL MACHINE WITH A HIGH LEVEL OF EFFICIENCY

(71) Applicant: Brose Fahrzeugteile GmbH & Co. KG, Wuerzburg, Wuerzburg (DE)

(72) Inventors: Sunny Zhang, Wuerzburg (DE); Jin Xu, Wuerzburg (DE); Daniel Fiederling, Wertheim (DE); Leszek Grzegorz Sawczuk, Wuerzburg (DE)

(73) Assignee: Brose Fahrzeugteile GmbH & Co. KG, Wuerzburg, Wuerzburg (DE)

( * ) Notice: Subject to any disclaimer, the term of this patent is extended or adjusted under 35 U.S.C. 154(b) by 412 days.

(21) Appl. No.: 14/485,213

(22) Filed: Sep. 12, 2014

(65) Prior Publication Data

US 2015/0001970 A1   Jan. 1, 2015

Related U.S. Application Data

(63) Continuation of application No. PCT/EP2013/000740, filed on Mar. 13, 2013.

(30) Foreign Application Priority Data

Mar. 13, 2012 (DE) .......................... 10 2012 005 141
Oct. 25, 2012 (DE) .......................... 10 2012 020 927
(Continued)

(51) Int. Cl.
*H02K 21/12* (2006.01)
*H02K 1/02* (2006.01)
(Continued)

(52) U.S. Cl.
CPC ................. *H02K 1/02* (2013.01); *H02K 1/06* (2013.01); *H02K 1/17* (2013.01); *H02K 1/27* (2013.01);
(Continued)

(58) Field of Classification Search
CPC ........... H02K 1/2766; H02K 1/02; H02K 1/27
(Continued)

(56) References Cited

U.S. PATENT DOCUMENTS 3,891,879 A * 6/1975 Yamada ................. H02K 19/08
310/156.03
5,962,944 A   10/1999 Narita et al.
(Continued)

FOREIGN PATENT DOCUMENTS

CN   1215942 A   5/1999
CN   1375122 A   10/2002
(Continued)

OTHER PUBLICATIONS

Japanese Office Action for Japanese Application No. 2014-561290 dated Jul. 5, 2016—English translation.
(Continued)

*Primary Examiner* — Thanh Lam
(74) *Attorney, Agent, or Firm* — Muncy, Geissler, Olds & Lowe, P.C.

(57) ABSTRACT

An electrical machine is provided, in particular an electric motor having a stator and also a rotor which is mounted such that it can rotate about a rotor axis and has a rotor body, wherein permanent magnets are arranged in holders of the rotor body. The permanent magnets being composed of a mixed material, wherein the mixture is set in such a way that the mixed material has a remanence field strength Br of between 0.6 Tesla and 1 Tesla and a coercive field strength Hcj of between 1300 and 2500 KA/m. Permanent magnets or composite bodies can be arranged in holders, and the permanent magnets or composite bodies can have a contour, the cross-sectional area of said contour which is situated
(Continued)

perpendicular to the longitudinal axis being reduced within the respective holder in the direction of the radially further outer end of said holder.

19 Claims, 7 Drawing Sheets

(30) Foreign Application Priority Data

| | | | |
|---|---|---|---|
| Oct. 25, 2012 | (WO) | ................ | PCT/EP2012/004460 |
| Oct. 25, 2012 | (WO) | ................ | PCT/EP2012/004461 |
| Oct. 25, 2012 | (WO) | ................ | PCT/EP2012/004462 |

(51) Int. Cl.

| | |
|---|---|
| *H02K 21/16* | (2006.01) |
| *H02K 1/27* | (2006.01) |
| *H02K 1/06* | (2006.01) |
| *H02K 1/17* | (2006.01) |
| *H02K 3/46* | (2006.01) |

(52) U.S. Cl.
CPC ........... *H02K 1/276* (2013.01); *H02K 1/2766* (2013.01); *H02K 1/2773* (2013.01); *H02K 3/46* (2013.01); *H02K 21/16* (2013.01); *H02K 2201/03* (2013.01); *H02K 2213/03* (2013.01)

(58) Field of Classification Search
USPC .................................. 310/43, 156.01–156.64
See application file for complete search history.

(56) References Cited

U.S. PATENT DOCUMENTS

| | | | |
|---|---|---|---|
| 7,556,082 | B2 | 7/2009 | Welchko et al. |
| 8,269,390 | B2 | 9/2012 | Sakai et al. |
| 2005/0040721 | A1 | 2/2005 | Kusase et al. |
| 2007/0284960 | A1 | 12/2007 | Fulton et al. |
| 2008/0231132 | A1 | 9/2008 | Minowa et al. |
| 2010/0052455 | A1* | 3/2010 | Feng ................. H02K 1/276 310/156.08 |
| 2010/0060223 | A1* | 3/2010 | Sakai ................. H02K 1/2766 318/494 |
| 2010/0072850 | A1 | 3/2010 | Miyata et al. |
| 2010/0171385 | A1* | 7/2010 | Sakai ................. H02K 1/2766 310/156.43 |
| 2010/0225191 | A1* | 9/2010 | Hiroshi ............. H02K 1/2766 310/156.38 |
| 2010/0277017 | A1 | 11/2010 | Alexander et al. |
| 2011/0121675 | A1* | 5/2011 | Yamashita ............. H01F 1/055 310/154.25 |
| 2011/0315913 | A1 | 12/2011 | Shigeoka et al. |
| 2013/0127280 | A1 | 5/2013 | Sugimoto et al. |
| 2013/0162089 | A1* | 6/2013 | Komuro ................. H02K 1/02 310/156.01 |

FOREIGN PATENT DOCUMENTS

| | | |
|---|---|---|
| CN | 101047325 A | 10/2007 |
| CN | 101232205 A | 7/2008 |
| CN | 101485064 A | 7/2009 |
| CN | 101946386 A | 1/2011 |
| CN | 102044944 A | 5/2011 |
| CN | 102300655 A | 12/2011 |
| DE | 10 2007 015 839 A1 | 10/2008 |
| DE | 10 2009 000 028 A1 | 7/2010 |
| EP | 1 223 658 A1 | 7/2002 |
| EP | 2 246 961 A1 | 11/2010 |
| EP | 2 360 814 A1 | 8/2011 |
| JP | S 59-61008 A | 4/1984 |
| JP | S 60-219947 A | 11/1985 |
| JP | H 08-340651 A | 12/1996 |
| JP | H 10-304610 A | 11/1998 |
| JP | 2003-017309 A | 1/2003 |
| JP | 2006-115663 A | 4/2006 |
| JP | 2007-208104 A | 8/2007 |
| JP | 2009-027846 A | 2/2009 |
| JP | 2010-098863 A | 4/2010 |
| JP | 2010-130859 A | 6/2010 |
| JP | 5398103 B2 | 1/2014 |
| WO | WO 01/22560 A1 | 3/2001 |
| WO | WO 2006/109615 A1 | 10/2006 |
| WO | WO 2007/146208 A1 | 12/2007 |
| WO | WO 2012/014260 A1 | 2/2012 |

OTHER PUBLICATIONS

Chinese Office Action for Chinese Application No. 201380014379.5 dated Sep. 28, 2016—English translation.
Japanese Office Action for Japanese Application No. 2014-561291 dated Aug. 30, 2016 with partial English translation.
Chinese Office Action for Chinese Application No. 201280071454.7 dated Apr. 29, 2016—English translation.
Chinese Office Action for Chinese Application No. 201380014358.3 dated Apr. 26, 2016—English translation.
U.S. Appl. No. 14/485,184, filed Sep. 12, 2014.
U.S. Appl. No. 14/485,266, filed Sep. 12, 2014.
U.S. Appl. No. 14/485,326, filed Sep. 12, 2014.
Chinese Office Action For Chinese Application No. 201280071454.7 dated Dec. 30, 2016—English translation.

* cited by examiner

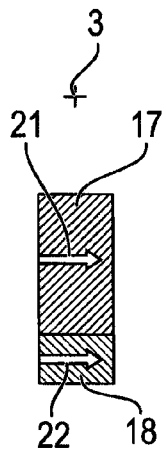
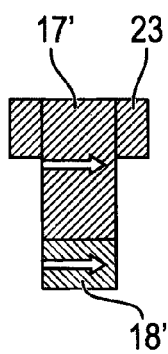
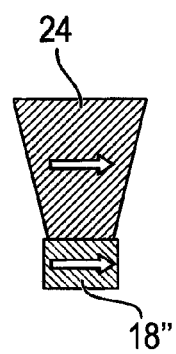
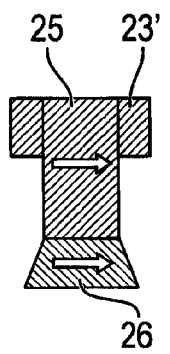
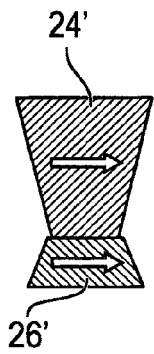
FIG. 3  FIG. 4  FIG. 5  FIG. 6  FIG. 7
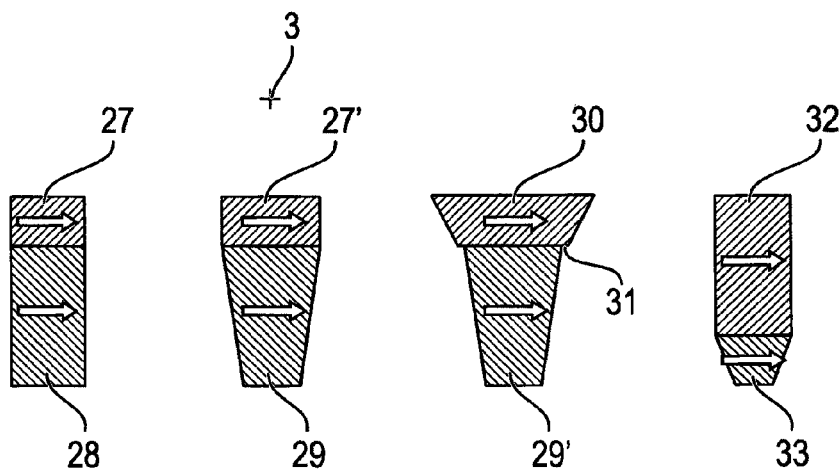
FIG. 8  FIG. 9  FIG. 10  FIG. 11

ELECTRICAL MACHINE WITH A HIGH LEVEL OF EFFICIENCY

This nonprovisional application is a continuation of International Application No. PCT/EP2013/000740, which was filed on Mar. 13, 2013, and which claims priority to German Patent Application No. 10 2012 005 141.7, which was filed in Germany on Mar. 13, 2012, to German Patent Application No. 10 2012 020 927.4, which was filed in Germany on Oct. 25, 2012, to International Patent Application No. PCT/EP2012/004460, which was filed on Oct. 25, 2012, to International Patent Application No. PCT/EP2012/004461, which was filed on Oct. 25, 2012, and to International Patent Application No. PCT/EP2012/004462, which was filed on Oct. 25, 2012, which are all herein incorporated by reference.

BACKGROUND OF THE INVENTION

Field of the Invention

The present invention relates to the field of electrotechnology and can be used advantageously in rotating electrical machines, for example, electric motors and generators.

The invention relates specifically to an electrical machine, particularly to an electric motor having a stator and a rotor, mounted rotatably around a rotor axis, having a rotor body, whereby permanent magnets are arranged in receptacles of the rotor body.

Description of the Background Art

Such machines can be formed, on the one hand, as an inner rotor with a rotor, located inside, surrounded by a stator and, on the other, as an outer rotor with a hollow cylindrical rotor within whose interior a stator is disposed. Depending on whether this concerns a brushless or a brushed machine, permanent magnets (brushless variant) are provided in the rotor or permanent magnets are provided in the stator and electromagnets in the rotor. Basically, such machines can be optimized in that especially high magnetic field strengths are produced in the magnetic gap between the rotor and stator, as a result of which high torques and power densities can be achieved. In the case of such performance features and corresponding electrical power of the machines, however, it is also increasingly important to allow high operating temperatures, whereby consideration must be given to the fact that the magnetic properties of the magnetic circuit are retained at high operating temperatures, as well as with high active magnetic fields and correspondingly large interfering fields, particularly that there is no demagnetization of the permanent magnets by interfering fields. For this purpose, certain coercive field strengths of the employed materials are necessary, at least in the region of the permanent magnets, exposed to the increased interference fields. On the other hand, high remanence values are also desirable, because these are decisive factors for the size of the achievable magnetic flux in the magnetic circuit.

Ultimately, suitable material values with optimally matched geometries should be combined in the construction of the rotor and stator.

SUMMARY OF THE INVENTION

It is therefore an object of the present invention to provide an electrical machine of the aforementioned type with permanent magnets, which are optimized for the highest possible power density of the machine and a high durability, especially also at high temperatures.

In this regard, it is provided according to the invention that the permanent magnets has at least partially a mixed material, whereby the mixture is adjusted such that at room temperature the mixed material has a remanence field strength Br between 0.6 tesla and 1 tesla and a coercive field strength Hcj between 1300 and 2500 kA/m. Room temperature in this case is assumed to be 20° C. It can be provided in particular that the mixed material at temperatures of 20° C. to 120° C., preferably also up to 180° C., has throughout a remanence field strength Br between 0.6 tesla and 1 tesla and a coercive field strength Hcj between 1300 and 2500 kA/m.

An especially advantageous embodiment of the invention provides that at least some, particularly all permanent magnets have at least partially a mixed material, which represents a mixture of a ferrite material and a magnetic material with rare earths.

In regard to the coercive field strength and/or the magnetic remanence, the mentioned materials do not have sufficient known rare earth materials, and particularly with respect to the coercive field strength, sufficient materials with mass fractions of heavy rare earths, and with respect to the remanence, sufficient materials containing predominantly light rare earths. On the other hand, the mentioned parameters can be adjusted such that the required field strengths, magnetic fluxes, and in the critical regions the required coercive field strengths and the required magnetic remanence, which are necessary for an electrical machine with a high level of efficiency and especially thermal stability and durability, can be achieved by a suitable geometric arrangement of the permanent magnets in the recesses of the rotor body.

The indicated parameters in regard to coercive field strength and remanence can be achieved especially advantageously by a mixed material with rare earth mass fractions, especially a light rare earth mass fraction, and amounts of ferrite materials. In particular, advantageously heavy rare earth materials can be totally omitted; i.e., their mass fraction can be zero or at least less than 1%. Thus, the necessary materials are available and relatively affordable.

It can also be advantageous in particular that all of the permanent magnets, arranged in the rotor, have the above-described composition of mixed materials, especially of the same mixed material. It can also be provided, however, that apart from the indicated set of permanent magnets, which has the same mixed material, a second set of permanent magnets is used, all of which also have the same material composition and which have especially a higher ferrite content than the first set of permanent magnets; advantageously they are formed exclusively of a ferrite.

Further, the mixed material of the first set of permanent magnets can be adjusted advantageously with respect to the mixing ratio such that the temperature coefficient of the remanence Br within a temperature range between −50° C. and 180° C. is between −0.11%/K and 0%/K.

It can furthermore be provided advantageously that the mixed material of the first set of permanent magnets is adjusted with respect to the mixing ratio such that the temperature coefficient of the coercive field strength Hcj (beta) within a temperature range between −50° C. and 180° C. is between −0.5%/K and +0.4%/K.

It is assured thereby that the magnetic properties in the first set of permanent magnets within the conventional operating range at temperatures up to 180° C. are within an optimal range and have little temperature dependence; in particular they are less temperature-dependent than materials that have a higher content of rare earths.

As a result, the stability of the electrical machine against demagnetization of the permanent magnets can be guaranteed also at elevated operating temperatures up to 180° C.

Advantageously the mixed material, which constitutes the permanent magnets or at least some of the permanent magnets, can contain a ferrite powder and a rare earth powder. The mixed material can be produced as a solid from a homogeneous mixture of a ferrite powder and a rare earth powder by sintering or other known molding techniques. Instead of a homogeneous mixture of the different powders, there can be a concentration gradient of the mixture, particularly of the rare earth fraction in the total mixed material or of the ferrite powder in the total mixed material, whereby the gradient can represent an abrupt or continuous linear or nonlinear increase in the concentration of one of the substances. For example, the content of the rare earth powder along the longitudinal axis of the permanent magnet or permanent magnets can increase or decrease from a radially more outward region to a radially more inward region of the permanent magnet.

A further embodiment of the invention can provide that the mixed material can be bound by a polymer, for example, by a casting resin. In this case, the individual powders can be combined with a polymer initially to form a liquid or a gel and this can be poured into a mold and hardened. For example, a recess in the form of a receptacle in the rotor body, in which the permanent magnet remains after hardening, can be used as the casting mold. The casting can also be a pressure casting process or injection molding process. The hardening of the polymer material can be accelerated by physical effects such as x-ray irradiation, alpha, beta, or gamma irradiation, or heat treatment.

During the production or hardening of the mixed material, an orientation magnetic field can be applied to produce an anisotropic material.

The individual powders, forming the components of the mixed material, can be produced for their part by comminution, particularly by grinding of a previously magnetically oriented material.

In this respect, the ferrite powder and/or the rare earth powder, particularly NdFeB, can advantageously be made magnetically anisotropic.

A further embodiment of the invention provides that the cross section of one or more of the permanent magnets, when viewed perpendicular to the longitudinal axis of the particular receptacle, decreases at least in sections toward the radially more outward end of the particular receptacle in the rotor body and that the permanent magnets fit together form-fittingly with the particular receptacle at least at their radially outer end, particularly with their entire outer contour.

Because of this form of the permanent magnets, these can be placed and retained advantageously within the particular receptacle in the rotor body. The high radial centrifugal forces, which are active particularly at high rotational speeds and act on the permanent magnets, are absorbed at the edge surfaces of the receptacles in the rotor body. A form-fitting contact of the permanent magnets with the edge surfaces of the receptacles permits a homogeneous force distribution during the occurrence of centrifugal forces. The fact that the cross-sectional area of the permanent magnets decreases radially outward at least in sections makes it possible to form-fittingly secure the permanent magnets by a correspondingly tapering form of the receptacle, without special retention projections having to be provided radially outward at the receptacles in the vicinity of the magnetic gap. Such projections are often especially vulnerable, because they are produced with the lowest material thickness possible, in order to allow the permanent magnets to come as close as possible to the magnetic gap. This often entails a mechanical susceptibility of the projections at the edge of the receptacles. Such problems are avoided by the described design.

In particular, when one or more permanent magnets in the rotor cross section have a barrel-shaped contour or a radially outward tapering contour, the centrifugal forces can be distributed well by a suitably adopted form of the receptacles.

In particular, if one or more permanent magnets has/have a stepped cross-sectional enlargement toward the radially inner end and the cross-sectional enlargement lies on the edge of a corresponding cross-sectional enlargement of the receptacle, the radial slipping of the permanent magnets out of the receptacles is effectively prevented.

A further embodiment of the invention provides that a permanent magnet in the form of a composite body has a radially more outward and a radially more inward permanent magnet and that the radially more inward permanent magnet has a greater cross-sectional area at the joining site between the two permanent magnets than the radially more outward permanent magnet.

This special design makes it possible to design the particular permanent magnets as composite bodies, having at least two permanent magnets, whereby the joining site between the component permanent magnets forms a contact surface for a respectively complementary edge region of the receptacle in the rotor body, where during rotation the permanent magnet is held back by the then acting centrifugal forces. The more radially outward one of the permanent magnets is then advantageously connected mechanically to the inner permanent magnet. The connection can be assured by gluing, clamping, or by a form-fitting connection or other joining technique. Of the permanent magnets, which together form a composite body, one or more, particularly two, can have a mixed material, which has the magnetic properties according to the invention. In particular, two or all of the permanent magnets of a composite body formed of a suitable mixed material, particularly of the same mixed material.

It also turns out to be especially advantageous that two joined permanent magnets of at least one composite body have magnetization directions parallel to one another.

This structural embodiment can establish especially favorably the magnetic flux in the rotor body.

Moreover, it can be provided advantageously that the permanent magnets and/or composite bodies are part of a V-shaped arrangement of components of a magnetic circuit.

Such V-shaped arrangements of permanent magnets in a rotor, whereby the legs of the V do not run precisely radially to the rotor axis but meet up in a point, which is at some distance radially from the rotor axis, allow an especially efficient configuration of the magnetic flux with correspondingly high field strengths and a high energy density of the electrical machine.

An embodiment provides that the permanent magnets and/or composite bodies are part of a Halbach array of components of a magnetic circuit. The permanent magnets of the Halbach array can be distributed along the circumference of the rotor.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus, are not limitive of the present invention, and wherein:

FIG. 3 shows in a cross section a permanent magnet configuration;

FIGS. 4-11 show in cross section further permanent magnet configurations;

DETAILED DESCRIPTION

Figure 1:
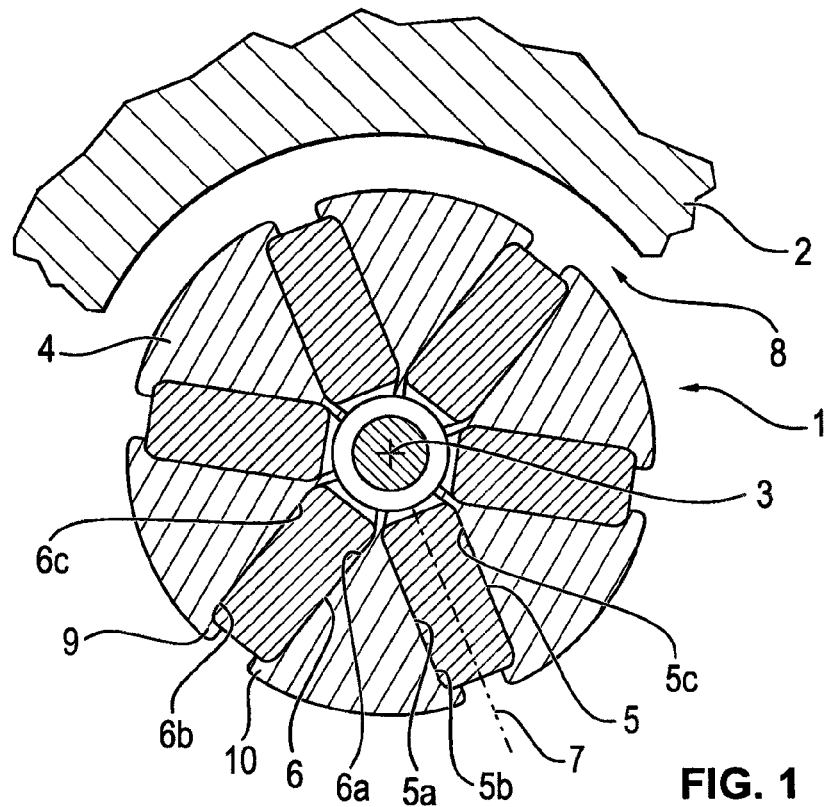
FIG. 1 shows in cross section a rotor and part of a stator of an electric motor.

FIG. 1 shows a rotor 1 of an electric motor, which is mounted rotatably within a stator 2 around a rotor axis 3. It can be seen in the cross section of FIG. 1 that six permanent magnets 5, 6 are retained in receptacles 5a, 6a within rotor body 4, whereby longitudinal axes 7 of the receptacles are oriented radially with respect to rotor axis 3. This type of construction is a so-called spoke-shaped arrangement of the permanent magnets. Magnetic gap 8 is illustrated as excessively large in FIG. 1. It is formed between the stator and the cylindrical outer surface of rotor 1.

In order to achieve an especially high efficiency of a corresponding electric motor, efforts are made to design the magnetic gap 8/rotor gap as small as possible.

Permanent magnets 5, 6 do not quite reach the cylindrical outer surface of rotor 1, because they are retained in the receptacles by projections 9, 10 of the rotor body in the area of the radially outer part of receptacles 5a, 6a. In particular, during rapid rotation, centrifugal forces act radially outward on permanent magnets 5, 6, so that projections 9, 10, which retain each of the individual permanent magnets, are exposed to considerable forces.

Figure 2:
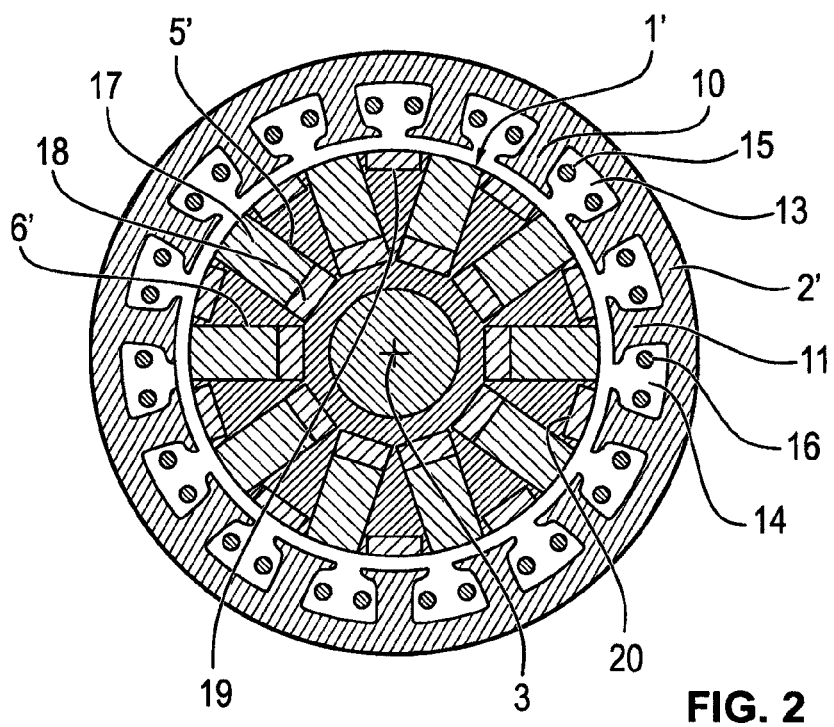
FIG. 2 shows a further rotor of an electric motor in cross section.

FIG. 2 shows an array of a rotor 1' and a stator 2', whereby in stator 2' in the cross section so-called stator teeth 11, 12 are shown, which in each case support electrical windings 15, 16 in stator slots 13, 14 lying between them. Windings 15, 16 can be supplied with a time-varying current by control electronics (not shown) for generating a rotating electric field.

In the receptacles rotor 1' supports permanent magnets 5', 6', which are oriented spoke-like to rotor axis 3 and in each case are divided in two in the radial direction and case are formed as composite bodies with a first component magnet 17 and a second component magnet 18. Permanent magnets 5', 6' can be retained in the receptacles, for example, by means of projections as shown in FIG. 1 and there designated with 9, 10 or be held in these by known joining techniques such as, for example, gluing, soldering, welding, clamping, or a form-fitting connection. Permanent magnets 5', 6' extend radially up to the cylindrical outer surface of the rotor and are flush with it.

It can be provided that component magnet 17, lying radially more outward in the particular receptacle, is formed from a first set of permanent magnets as a ferrite part or with a content of ferrite materials, whereas the radially more inward component magnet 18, which belongs to a second set of permanent magnets, formed of a material containing rare earths. Advantageously, this component magnet contains predominantly light rare earths, particularly a higher proportion of light rare earths than of heavy rare earths, and more advantageously no heavy rare earths. Both component magnets can have one, particularly the same mixed material according to the invention, whereby advantageously the mixed material of the radially more inward component magnet contains a lower amount of rare earth elements than the radially more outward component magnet.

Use of the described array achieves that the permanent magnet array as a whole in the region where the greatest magnetic field strengths act, i.e., in the vicinity of the magnetic gap, has at least predominantly or completely of a ferrite material, which is cost-effective and has a sufficient coercive field strength, whereas the high magnetic remanence of rare earth materials is utilized in component magnets 18 that are radially more inward and farther removed from interfering magnetic fields. It is prevented in this way that a demagnetization occurs in the region of the magnetic gap, whereby overall a minimal amount of rare earth materials is employed.

For the further advantageous design of the magnetic fields within the rotor/rotor body, it is provided according to FIG. 2 that additional permanent magnets 19, 20 of a third set of permanent magnets are inserted in each case between two spoke-like adjacent permanent magnet arrays. The permanent magnets of the third set can include, for example, of a ferrite material, particularly without rare earth fractions. The possibly thereby achieved magnetic field or magnetic flux arrays, for example, Halbach arrays, will be discussed in greater detail below.

FIGS. 3 to 11 describe in cross section permanent magnet arrays with 2 permanent magnets, which have a first component magnet in the respective top area of the illustration and a second component magnet in the respective bottom area of the illustration. Basically, the figures are laid out so that the bottom area of the illustration of the rotor axis of a rotor of an electromagnet is farther away than the top area. One or both of the illustrated magnets can include a mixed material, whose mixture is adjusted such that at room temperature the mixed material has a remanence field strength Br between 0.6 tesla and 1 tesla and a coercive field strength Hcj between 1300 and 2500 kA/m. The corresponding permanent magnet arrays in this case can be used in a spoke-like arrangement with respect to the rotor axis, but a so-called V-shaped array of permanent magnets is also conceivable, which will be discussed in greater detail below. The particular permanent magnet arrays are advantageously placed in receptacles of a rotor body, which are advantageously formed form-fittingly in relation to the permanent magnet arrays; i.e., the permanent magnet arrays are surrounded without a gap. It can also be provided, however, that the receptacles surround the particular magnet arrays form-fittingly only in sections, for example, in the area in which the cross section of the permanent magnet array decreases when viewed in the radially outward direction.

In FIG. 3, rotor axis 3 is drawn in by way of example above the permanent magnet array. The cross section of both component magnets 17, 18 is rectangular and of the same size, so that the entire magnet array is formed rectangular with an unchanging cross section. Magnetization directions 21, 22 of both component magnets 17, 18 are indicated by arrows, as is also the case in all other permanent magnet arrays in FIGS. 3 to 11.

In FIG. 4, in the case of the radially inner component magnet 17' in the radially inner region a rectangular extension 23 is provided, by which the magnet array is retained in the receptacle in the case of radially acting centrifugal forces. It should be noted in principle that according to FIGS. 3, 4, 5, 6, 7, and 11, the radially inner component magnet of the magnet array is formed longer in the radial direction than the radially outer component magnet. According to FIGS. 8, 9, and 10, the distribution is reversed, with the radially inner component magnet formed shorter in the radial direction than the radially outer component magnet.

FIG. 5 shows a trapezoidal cross section of the radially inner component magnet 24, whereby the trapezoid tapers off radially outward. The radially outer component magnet 18" is made rectangular.

FIG. 6 shows a radially inner component magnet 25 with a rectangular extension 23', whereby the radially outer component magnet 26 is formed trapezoidal in cross section and widening radially outward.

FIG. 7 shows the radially inner component magnet 24' with a trapezoidal shape in cross section which tapers radially outward, whereby the radially outer component magnet 26' is formed as a trapezoid, as shown in FIG. 6, tapering radially inward.

All arrays shown in FIGS. 4 to 7 have undercuts, which reliably prevent a radial slipping radially outward out of a suitably formed receptacle in a rotor body.

FIG. 8 shows a cross section of a rectangular magnet array, whereby the radially inner component magnet 27 has a smaller dimension in the radial direction than the radially outer component magnet 28.

The magnet array in FIG. 9 shows in cross section a rectangular radially inner component magnet 27', whereby the radially outer component magnet 29 is formed trapezoidal in cross section and tapers radially outward with respect to rotor axis 3.

According to FIG. 10, both component magnets 29' and 30 are formed trapezoidal in cross section, whereby in each case the trapezoids taper radially outward with respect to the rotor. In addition, between component magnet 29' and component magnet 30 a projection 31 is formed at the joining surface in that the smaller surface area of the trapezoidal form of component magnet 30 is larger than the larger surface area of the trapezoidal cross-sectional form of component magnet 29'.

Thus, an abrupt reduction in the cross-sectional area is provided at the transition or at the joining site between the radially inner component magnet 30 and the radially outer component magnet 29'.

FIG. 11 shows a cross-sectional array in which the radially inner component magnet 32 is made rectangular and the radially outer component magnet 33 is made trapezoidal, whereby the trapezoidal cross section of the radially outer component magnet 33 tapers radially outward.

The arrays shown in FIGS. 9, 10, and 11, like the arrays shown in FIGS. 4, 5, 6, and 7, have a reduction in their cross section from radially inward to radially outward, which in each case brings about the retention in a suitably formed receptacle of a rotor body.

In addition to the arrays shown in FIGS. 3 to 11, other cross-sectional arrays are conceivable, in which, for example, the boundary surfaces of the particular shown rectangle and trapezoid can also be replaced by convex or concave boundary lines, for example, also partially spherical and barrel-shaped boundary lines.

Figure 12:
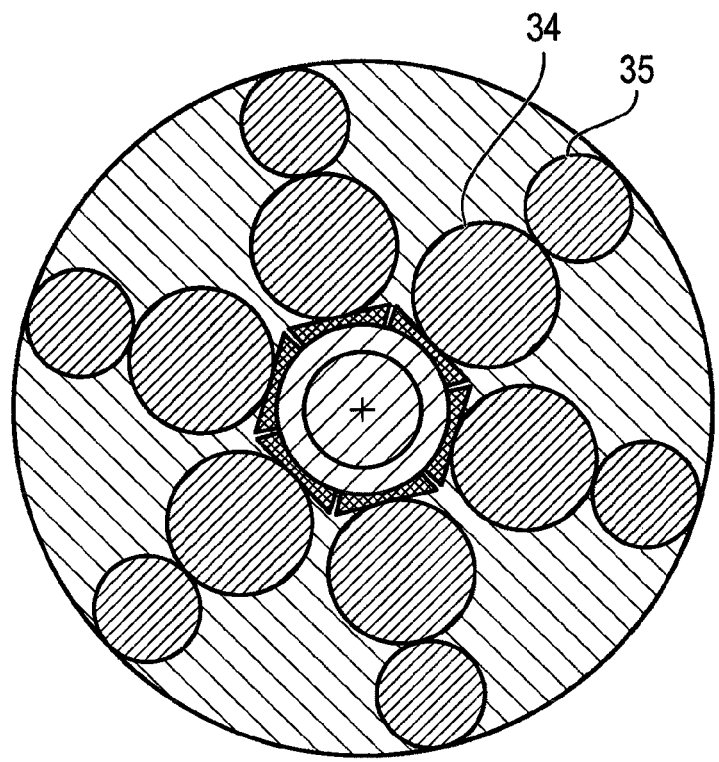
FIG. 12 shows in cross section a further rotor of an electric motor.

FIG. 12 shows, for example, in cross section a rotor of an electric motor with permanent magnet arrays/composite bodies arranged in a spoke shape, whereby each individual permanent magnet array has two component magnets 34, 35 circular in cross section, whereby the radially outer component magnet 35 in each case has a smaller diameter in cross section than the radially inner component magnet 34. It can also be provided, however, that each outwardly disposed component magnet has a larger diameter than the radially inner component magnet seen in cross section. Retention of the magnet arrays in suitably shaped receptacles already occurs due to the form which is circular in cross section.

Here as well, preferably the radially outer component magnet 35 can have a ferrite or ferrite-containing material and the radially inner component magnet 34 either also of a ferrite material or of a rare earth-containing material or of a mixture of both materials. Likewise, the component magnets of the radially inner group 34 can have a different material than the radially outer component magnets 35.

Figure 13:
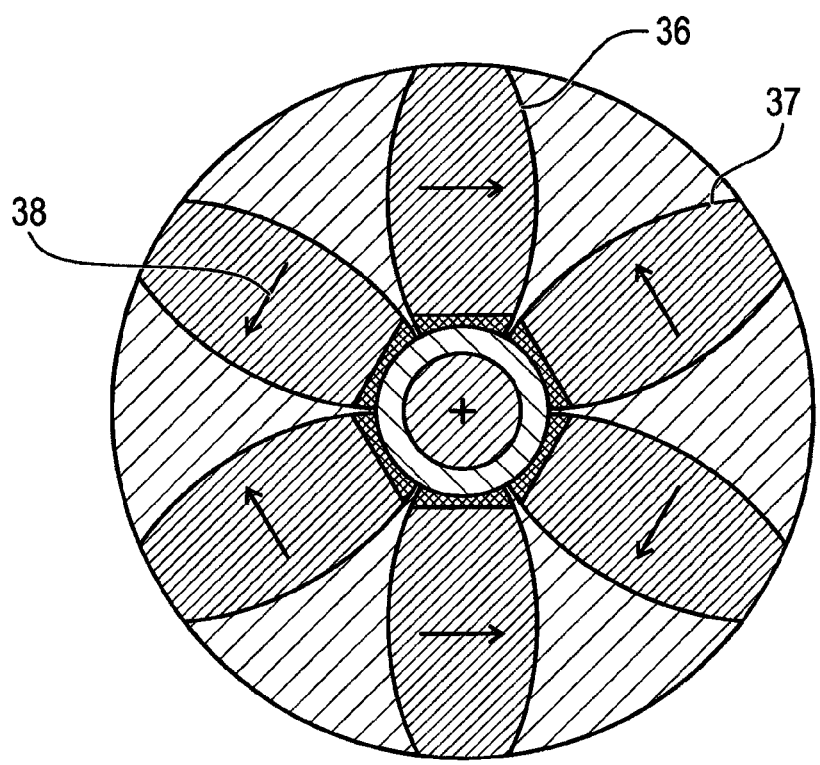
FIG. 13 shows in a further cross section a further rotor of an electric motor with permanent magnets which in cross section are barrel-shaped.

FIG. 13 shows in cross section a permanent magnet arrangement of a rotor with permanent magnets 36, 37, each of which is barrel-shaped in cross section. It is indicated here that the magnetization, which is indicated by the azimuthally oriented arrows 38, in two permanent magnets 36, 37, arranged in adjacent receptacles, is directed in opposite directions.

The barrel-shaped cross-sectional form of permanent magnets 36, 37 by its undercut in the radial direction also brings about a retention in suitably shaped receptacles of the rotor body. Therefore, projections 9, 10 as shown in FIG. 1 can be completely omitted and the permanent magnets and composite bodies 34, 35, 36, 37 can extend up to the cylindrical outer surface of the rotor. As a result, a smaller distance of the permanent magnets to the stator and thereby a high efficiency of the electrical machine or a high power density are or can be achieved.

Figure 15:
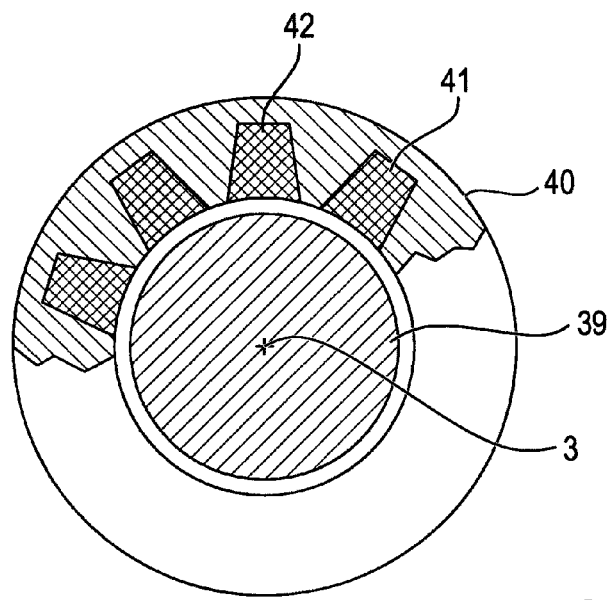
FIG. 15 shows in cross section an outer rotor and an inner stator of an external rotor motor.

To round off the invention, FIG. 15 shows an array with an inner stator 39 and an outer rotor in the form of a hollow cylindrical rotor 40. The rotor axis is designated by 3 and rotor 40 is mounted rotatably around rotor axis 3.

Permanent magnets 41, 42, which are oriented in a spoke-shaped arrangement on rotor axis 3 and taper radially outward in cross section, are shown within the rotor body. The receptacles, in which permanent magnets 41, 42 are held, are accordingly designed form-fittingly.

Figure 14:
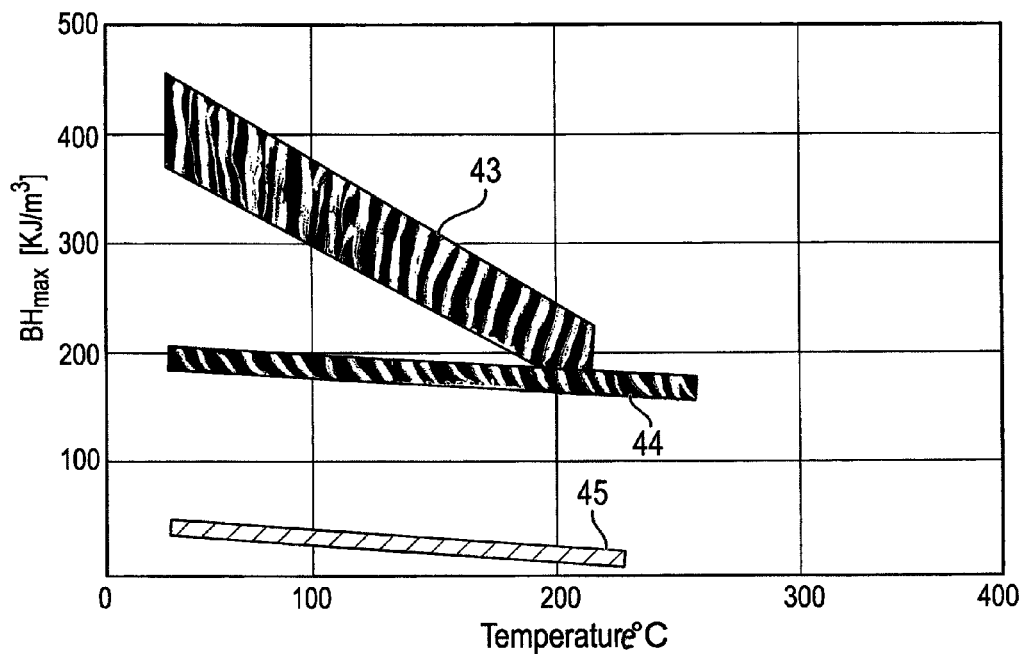
FIG. 14 shows a diagram with parameters of magnetic materials.

FIG. 14 is to show that especially with special geometric arrays of permanent magnets, as are illustrated in the figures of this application, apart from the use of different materials for the component magnets of a single rotor, particularly also apart from the use of different materials for different component magnets of a composite body, the number of employed different materials for the used permanent magnets of a rotor can also be reduced by suitable material selection. In particular materials that have a mixed material are considered here, whereby the mixture is adjusted such that at least at room temperature the mixed material has a remanence field strength Br between 0.6 tesla and 1 tesla. Alternatively or in addition, the mixed material can have the property that at room temperature the coercive field strength Hcj is between 1300 and 2500 kA/m. When such a material is used, particularly if permanent magnets in the form of composite bodies made of a mixed material are used, advantageously two or more component magnets of a composite body can have the indicated material. This material then has in the radially inner region of the rotor the same composition and the same physical properties as in the radially outer part of the composite body and therefore also the same composition in the region close to the magnetic gap as in the region far from the magnetic gap. Such materials can be produced, for example, from ferrite and ferrite-like substances, particularly with addition of rare earth metals, whereby these mixed materials advantageously can be free of heavy rare earth materials. Overall, therefore, the use of rare earths in permanent magnets in a rotor can be reduced. The necessary or advantageous values for the remanence field strength and the coercive field strength can be achieved with such a material. In FIG. 14, a substance of the class Nd/(Dy/Th)/Fe/B, represented by its values BHmax in kJ per m$^3$, is plotted versus the temperature with the first cross-hatched area 43. It is evident that this parameter declines considerably in the range of a relatively high operating temperature of 180 to 200° C. in a motor. The third cross-hatched region 45 shows the corresponding parameter range of conventional ferrites. The second cross-hatched region 44 shows the substances used according to the invention, which, for example, can be produced as a mixture between ferrites and rare earths, whereby the coercive field strength and the remanence lie between those of rare earth materials and ferrites, whereby the temperature dependence is substantially lower than in the magnetic materials containing more or exclusively rare earths. Advantageously, a temperature dependence between −0.11% and 0% per kelvin with regard to the remanence field strength Br is realized in the case of suitable mixed materials. These values should be maintained between −50° C. and +180° C.

Moreover, in regard to the coercive field strength Hcj a temperature coefficient of −0.5% to +0.4% per kelvin can be realized, which is applicable between a temperature of −50° C. and +180° C.

Suitable mixed materials can be produced as polymer-bound hybrids, whereby NdFeB can be mixed in powder form with a ferrite powder. In particular, because the temperature dependence of the coercive field strength of NdFeB is negative and that of ferrite powders is positive, a lower temperature coefficient can be set by a suitable mixture. The individual powders can be produced magnetically anisotropic by suitable known processes such as grinding of pre-magnetized materials and used. As a result, the magnetically attenuating effect of the polymer binder can be compensated. The production and binding of the corresponding magnetic bodies can occur in a strong magnetic DC field in order to achieve a suitable orientation of the anisotropic powder materials. It is possible, moreover, to mold the magnetic bodies in the receptacles of the particular rotor body by injection molding, high-pressure injection molding, and other techniques.

Permanent magnets of the invention can also be realized by sintering of powder materials, particularly a mixture of ferrite powder and a rare earth-containing powder.

Advantageously, in an employed mixed material the mass fraction of rare earth materials, particularly light rare earth materials, in the total amount can be between 10 and 50%, more advantageously between 20 and 25%. The rest of the mixed material can be formed, for example, of ferrites or contain ferrites.

Figure 16:
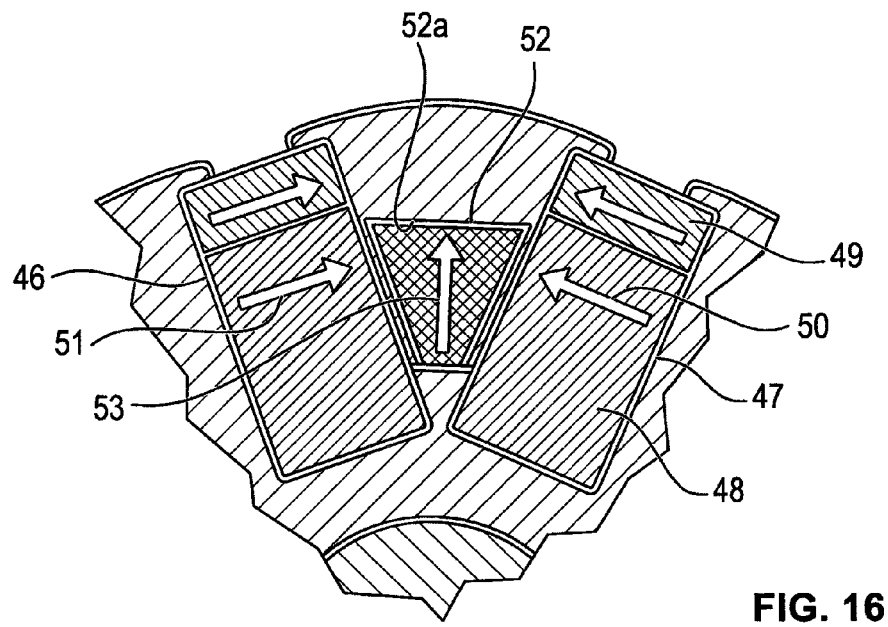
FIG. 16 shows in cross section a detail of another rotor of an electric motor.

The field strength necessary for a suitable efficiency of the described electrical machine can be achieved by the mentioned materials particularly when suitable geometric arrays of the permanent magnets are used, optionally with an optimized molding of the individual magnets. In this regard, FIG. 16 shows, for example, in cross section a detail of a rotor of an electrical machine with two permanent magnets, each of which is formed as a composite body 46, 47, whereby each composite body 46, 47 has two component magnets 48, 49. Magnetization directions 50, 51 are uniform for each composite body 46, 47 and opposite between composite bodies 46, 47. The radially outer component magnets 49 typically form permanent magnets of a first set, whereas the radially internally arranged component magnets 48 form the permanent magnets of a second set. The material composition of the permanent magnets of the first and second sets can be the same or also different. In addition, in FIG. 16 a permanent magnet 52 of a third set of permanent magnets can be seen, whereby this last mentioned permanent magnet 52 has a trapezoidal form in cross section, which tapers toward the radially inner region of the rotor. Magnetization direction 53 of permanent magnet 52 is directed radially outward.

The permanent magnets shown in FIG. 16 form a typical section of a Halbach array of permanent magnets, which produces an especially strong flux concentration on one side of a magnet array, therefore typically in the area of the magnetic gap. A permanent magnet 52 in an appropriate pocket 52*a* is provided between two composite bodies 46, 47, which are arranged spoke-like and formed in each case of permanent magnets made up of two magnets 48, 49.

Figure 17:
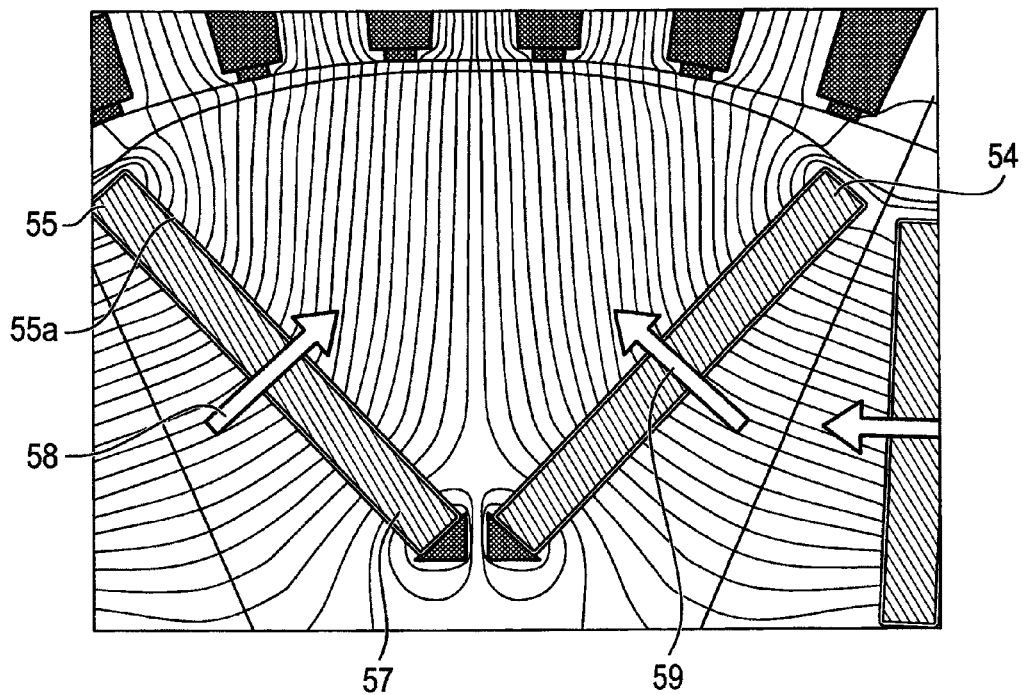
FIG. 17 shows in a partial cross-sectional illustration part of a rotor and a stator of an electric motor, whereby two permanent magnets are shown in a V configuration.
Figure 18:
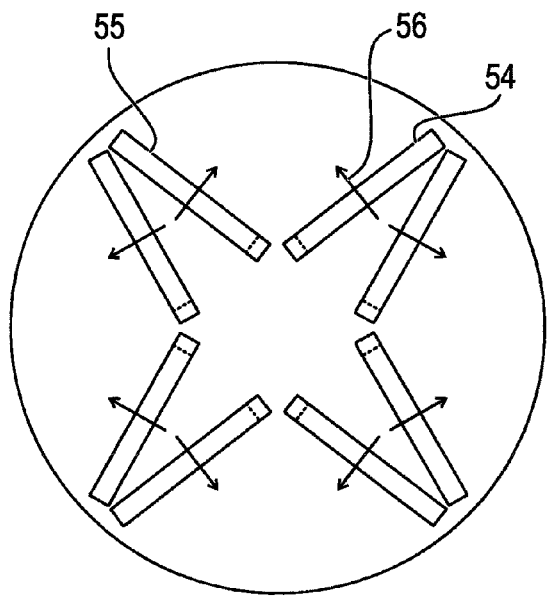
FIG. 18 shows in a schematic cross section a rotor of an electric motor, whereby the permanent magnets are arranged in V configurations.

FIG. 17 shows in cross section a permanent magnet array with two permanent magnets 54, 55 in a V arrangement, which are arranged in matching recesses 55*a* arranged correspondingly in a V shape. Permanent magnets 54, 55 each form a leg of an imaginary V, whereby permanent magnets 54, 55 do not approach the rotor axis with their longitudinal axes. The longitudinal axes of the permanent magnets rather intersect at a point, located radially outside the rotor axis at a distance from it. The array of such a so-called V-shaped arrangement of permanent magnets is shown schematically in the overview in FIG. 18. Four pairs of permanent magnets 54, 55 arranged in a V shape and the corresponding magnetization directions 56 are illustrated there. To clarify the configuration of the magnetic flux, the field lines between permanent magnets 54, 55 are drawn in FIG. 17. The V-shaped arrangement of permanent magnets 54, 55 results in an optimal field density in the area of the magnetic gap between the rotor and stator. This array can be optimized by the use of the mixed materials of the invention.

The individual permanent magnets 54, 55 can also be divided in their longitudinal direction and includes two component magnets each, as is indicated in permanent magnet 55 by a dashed line and the labeling of the radially inner component magnet with the reference number 57. All permanent magnets, however, can also is formed homogeneously of a single material. Permanent magnets/composite bodies 54, 55, arranged in a V shape and optionally having a plurality of component magnets, can also be assembled like the arrays shown in FIGS. 3 to 11. In other respects, the magnetization direction of the permanent magnets is indicated by arrows 58, 59 in FIG. 17.

Figure 19:
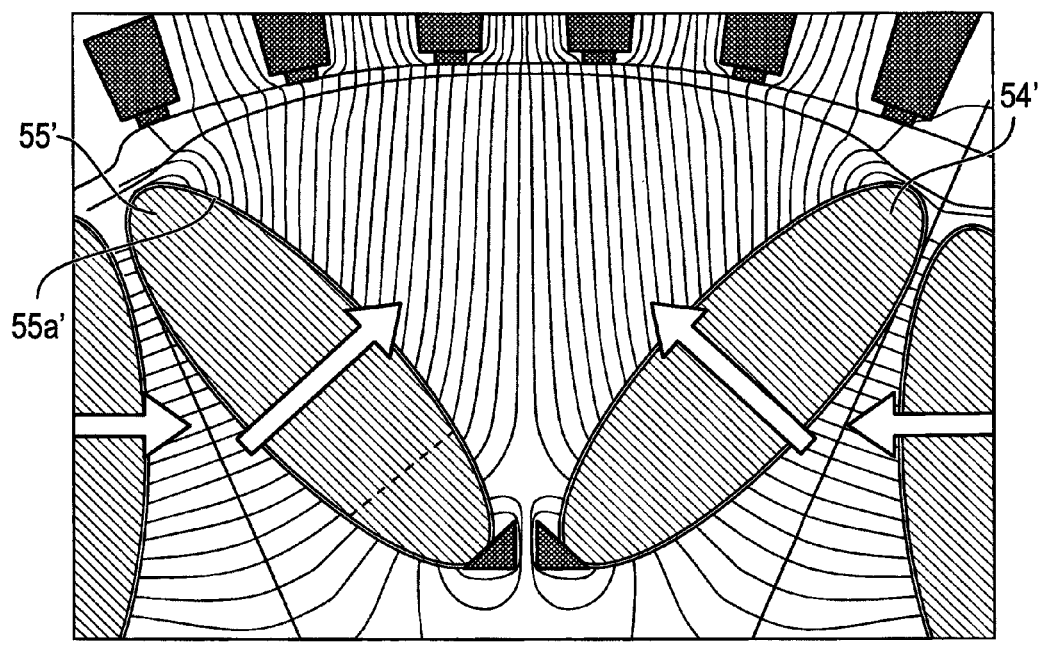
FIG. 19 shows partially a cross section of a rotor and a stator of an electric motor with permanent magnets in a V configuration.

In FIG. 19, a similar array is shown in cross section as in FIG. 17, whereby the individual permanent magnets 54', 55' however are formed barrel-shaped or oval in cross section. This results in a good retention in suitably shaped receptacles 55'a of the rotor body and in a further optimized field design, as will be described in still greater detail below with use of FIGS. 22 and 23. The permanent magnets shown in FIG. 19 as well can have a plurality of component magnets of a first and second set of permanent magnets.

Figure 20:
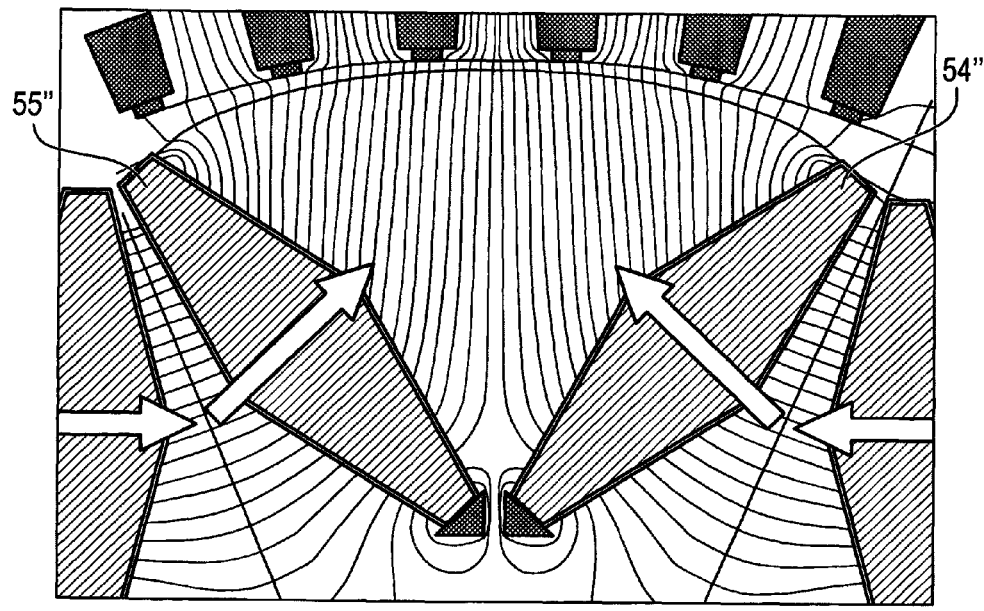
FIG. 20 shows an arrangement as illustrated in FIG. 19 with permanent magnets shaped as double trapezoids in cross section.

FIG. 20 shows an illustration according to FIGS. 17 and 19, whereby permanent magnets 54", 55" in cross section has two trapezoidal quadrilaterals, whose bases abut one another, whereby the individual trapezoidal bodies are connected as one piece or can also represent component magnets, which are combined to form a composite body.

The magnetization directions are indicated similar to FIGS. 17 and 19 in the form of arrows.

Instead of the shown two trapezoidal bodies, two component magnets, barrel-shaped in cross section, namely, a radially inner and a radially outer partial body, either connected together or at the least adjacent to one another, can form a composite body.

Figure 21:
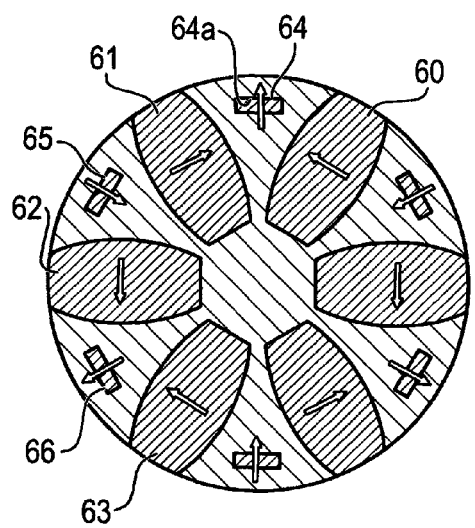
FIG. 21 shows a cross section of a rotor with permanent magnets, formed barrel-shaped in cross section, in a spoke arrangement.

FIG. 21 shows by way of example a so-called Halbach array of magnets, whereby the individual component magnets 60, 61, 62, 63, 64, 65, 66 of the Halbach array are lined up in the circumferential direction. Basically, permanent magnets 60, 61, 62, 63 arranged spoke-like are provided, whereby a first pair 60, 61 has magnetization directions directed to one another, represented by arrows in FIG. 21. The adjacent pair of permanent magnets 62, 63 also has magnetization directions directed toward one another, whereby the magnetization directions of permanent magnets 61 and 62 are formed in the opposite direction to one another and directed away from one another.

The additional permanent magnets 64, 65, 66, each arranged between adjacent permanent magnets, have, alternating in the circumferential direction, a magnetization direction directed radially outward and radially inward. By this total array, the magnetic flux is minimized radially inward with respect to permanent magnets 60, 61, 62, 63 and the magnetic flux is maximized radially outside the magnets. An optimized magnetic field strength results in the area of the magnetic gap between the stator and rotor.

Figure 22:
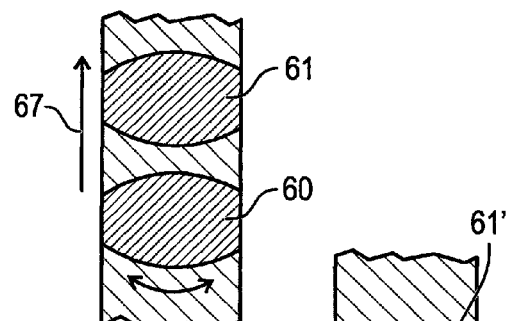
FIG. 22 shows an "rolled out" illustration of a rotor with permanent magnets, which are barrel-shaped in cross section.
Figure 23:
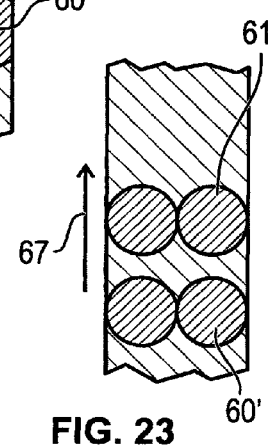
FIG. 23 shows an "rolled out" illustration of a cross section of a rotor of an electric motor similar to FIG. 22, whereby the permanent magnets, which are barrel-shaped in cross section, are formed barrel shaped as two parts.

In addition to the optimized arrangement and orientation of the permanent magnets, the magnetic field strength or flux can also be optimized by the external shaping of the individual permanent magnets. FIG. 22 shows for clarification a linear unrolled array of two permanent magnets 60, 61 lying next to one another in a cylindrical rotor. Closer examination of the magnetic and physical relationships shows that the remanence field strength of such an arrangement increases with a declining distance of the permanent magnets in the azimuthal direction, as indicated by arrow 67, as well as with the expansion of the individual permanent magnets in the azimuthal direction. In addition, the flux density can be increased in that the surface on which flux lines can emerge out of the particular permanent magnets in the azimuthal direction or enter them, is enlarged. Thus, due to the double barrel-shaped design of permanent magnets 60', 61', a still higher flux density results in the variant shown in FIG. 23 than in the array according to FIG. 22.

The measures, described individually in the above examples, for increasing the flux density within the rotor body or for designing the entire magnetic flux are to be understood as measures that can be combined for designing an optimized rotor, tailored to particular requirements. Thus, an electrical machine can be produced according to the invention, which allows a high power density and high torques of an electrical machine to be achieved with the lowest possible use of rare earth elements.

The invention being thus described, it will be obvious that the same may be varied in many ways. Such variations are not to be regarded as a departure from the spirit and scope of the invention, and all such modifications as would be obvious to one skilled in the art are to be included within the scope of the following claims.

What is claimed is:

1. An electrical machine comprising:
a stator; and
a rotor that is mounted rotatably around a rotor axis and has a rotor body; and
permanent magnets formed of at least partially of a mixed material are arranged in receptacles of the rotor body, wherein the mixture is adjusted such that at room temperature the mixed material has a remanence field strength Br between 0.6 tesla and 1 tesla and a coercive field strength Hcj between 1300 and 2500 kA/m.

2. The electrical machine according to claim 1, wherein at least some of the permanent magnets are formed of at least partially of a mixed material, which represents a mixture of a ferrite material and a magnetic material with rare earths.

3. The electrical machine according to claim 1, wherein the mixture is adjusted such that a temperature coefficient of the remanence Br in a temperature range between −50° C. and 180° C. is between −0.11%/kelvin and 0%/kelvin.

4. The electrical machine according to claim 1, wherein the mixture is adjusted such that the temperature coefficient of the coercive field strength Hcj within a temperature range between −50° C. and 180° C. is between −0.5%/kelvin and +0.4%/kelvin.

5. The electrical machine according to claim 1, wherein the mixed material contains a ferrite powder and a rare earth powder.

6. The electrical machine according to claim 1, wherein the mixed material is bound by a polymer.

7. The electrical machine according to claim 1, wherein the mixed material is produced by injection molding, high-pressure casting, or sintering with use of a ferrite powder and a rare earth-containing powder.

8. The electrical machine according to claim 1, wherein the ferrite powder and/or the rare earth powder, particularly NdFeB, is designed as magnetically anisotropic.

9. The electrical machine according to claim 1, wherein a cross section of one or more of the permanent magnets decreases at least in sections toward a radially outward end of the particular receptacle and wherein the permanent magnets fit together form-fittingly with the respective receptacle at least at their radially outer end, particularly with their entire outer contour.

10. The electrical machine according to claim 1, wherein one or more permanent magnets in cross section of the rotor have a barrel-shaped contour or a radially outwardly tapering contour.

11. The electrical machine according to claim 1, wherein one or more of the permanent magnets have a stepped cross-sectional enlargement toward a radially inner end of the particular receptacle.

12. The electrical machine according to claim 1, wherein a composite body has a radially more outward and a radially more inward permanent magnet and wherein the radially more inward permanent magnet has a larger cross-sectional area at the joining site between the two permanent magnets than the radially more outward permanent magnet.

13. The electrical machine according to claim 1, wherein two joined permanent magnets of at least one composite body have magnetization directions parallel to one another.

14. The electrical machine according to claim 1, wherein the permanent magnets and/or composite bodies are part of a V-shaped arrangement of components of a magnetic circuit.

15. The electrical machine according to claim 1, wherein the permanent magnets and/or composite bodies are part of a Halbach array of components of a magnetic circuit.

16. The electrical machine according to claim 1, wherein a first set of permanent magnets has a lower mass fraction of rare earths than a second set, and no content of rare earths.

17. The electrical machine according to claim 1, wherein a second set of permanent magnets has a mass fraction of light rare earth elements and wherein the mass fraction of heavy rare earth element is smaller than a fraction of light rare earth elements, or wherein the mass fraction of heavy rare earth elements is zero.

18. The electrical machine according to claim 1, wherein the rotor has receptacles with permanent magnets of a third set, wherein the permanent magnets of the third set differ from the permanent magnets of the first and second set with respect to the material composition.

19. The electrical machine according to claim 1, wherein the electrical machine is an electric motor.

* * * * *